(12) United States Patent  (10) Patent No.: US 7,764,446 B2
Suzuki et al.  (45) Date of Patent: Jul. 27, 2010

(54) BONDED OPTICAL ELEMENT

(75) Inventors: Tetsuya Suzuki, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 12/121,227

(22) Filed: May 15, 2008

(65) Prior Publication Data
US 2008/0297919 A1 Dec. 4, 2008

(30) Foreign Application Priority Data
May 18, 2007 (JP) ............................. 2007-133360

(51) Int. Cl.
G02B 9/00 (2006.01)
C03B 11/02 (2006.01)
C03B 23/00 (2006.01)
C03B 29/00 (2006.01)

(52) U.S. Cl. ............................. 359/796; 65/39; 65/102

(58) Field of Classification Search .................... 65/37, 65/39, 64, 102; 264/2.7; 359/796
See application file for complete search history.

(56) References Cited

U.S. PATENT DOCUMENTS

| 5,160,361 | A * | 11/1992 | Murata et al. ................. 65/102 |
| 6,551,530 | B2 | 4/2003 | Koizumi et al. |
| 2007/0091472 | A1 | 4/2007 | Alkemper et al. |
| 2007/0119212 | A1 * | 5/2007 | Huang et al. .................... 65/26 |
| 2008/0285154 | A1 | 11/2008 | Suzuki et al. |
| 2008/0297920 | A1 * | 12/2008 | Suzuki et al. ................ 359/716 |

FOREIGN PATENT DOCUMENTS

| JP | 60-067118 | 4/1985 |
| JP | 10-045419 | 2/1998 |
| JP | 11-130448 | 5/1999 |
| JP | 3763552 | 1/2006 |
| JP | 2006-171164 A | 6/2006 |

OTHER PUBLICATIONS

United States Office Action issued in U.S. Appl. No. 12/121,263 dated Oct. 8, 2009.
United States Office Action issued in U.S. Appl. No. 12/121,155 dated Sep. 18, 2009.
United States Office Action issued in U.S. Appl. No. 12/121,125 dated Nov. 3, 2009.
U.S. Appl. No. 12/121,263, filed May 15, 2008.
U.S. Appl. No. 12/121,155, filed May 15, 2008.
U.S. Appl. No. 12/121,125, filed May 15, 2008.

* cited by examiner

*Primary Examiner*—David N Spector
(74) *Attorney, Agent, or Firm*—McDermott Will & Emery LLP

(57) ABSTRACT

In a bonded optical element, a second optical element is bonded to a first optical element by forming the second optical element by heating and pressing against the first optical element a second optical element material. The first optical element is a concave lens. A bonded face of an intermediate portion between a lens portion and an edge portion of the first optical element is substantially in an R shape in section.

12 Claims, 5 Drawing Sheets

(a)

(b)

BONDED OPTICAL ELEMENT

FIELD OF THE INVENTION

The present invention relates to optical elements used for optical systems and the like, such as picture-taking lenses, optical pickups, and the like and especially relates to a bonded optical element in which optical elements different from each other are bonded to each other.

DESCRIPTION OF RELATED ART

Conventionally, bonded optical elements in which two or more kinds of lenses or prisms are bonded to each other are manufactured in such a manner that optical elements finished in advance by grinding, polishing, pressing, or the like are bonded to each other by means of an adhesive typified by a UV curing agent. This method, however, involves a step of manufacturing each optical element, a positioning step of arranging and positioning the two or more optical elements highly accurately, and a bonding step of applying and curing the adhesive uniformly with air void eliminated, which serve as a bar to increases in accuracy and productivity of the bonded optical elements.

For tackling this problem, there has been proposed in order to eliminate the positioning step and the bonding step methods for forming a bonded optical element by bonding by fusing glass materials.

For example, Patent Document 1 discloses a method for forming a composite optical element in which a first optical element and a second optical element material are disposed between an upper die and a lower die, and the second optical element material is pressed by the dies and the first optical element while being heated at a temperature capable of deforming the second optical element material and incapable of deforming the first element to form a second optical element, thereby integrating the first and second optical elements with each other.

Patent Document 2 proposes a method including the steps of: forming a first optical element by heating and pressing a first optical element material with the use of a pair of first and second dies and a sleeve die; taking out the second die and placing a second optical element material and a third die; and forming a second optical element by heating and pressing the second optical element material with the use of the first optical element and the third die, whereby the first and second optical elements are positioned accurately.

In addition, in order to prevent a crack caused due to a shortened cooling period from being formed, Patent Document 3 proposes a method of forming a glass lens by directly bonding glasses to each other between which the difference in linear expansion coefficient is in a range between $3 \times 10^{-7}$ and $8 \times 10^{-7}$.

Patent Document 1: Japanese Unexamined Patent Application Publication 60-67118

Patent Document 2: Japanese Unexamined Patent Application Publication 11-130448

Patent Document 3: Japanese Patent No. 3763552

SUMMARY OF THE INVENTION

Problems that the Invention is to Solve

In forming a bonded optical element by heating and press forming, suppression of occurrence of breakage and cracks is an inevitable problem. Occurrence of breakage and cracks depends on materials and bonded conditions (forming conditions) of to-be-bonded optical elements and the shapes of the bonded faces. The present inventions examined to find that in the case where a corner is present in the bonded faces, breakage and cracks are liable to occur especially at the corner, which serves as one of causes of inhibiting stable formation.

In the conventional bonding and forming, however, suppression of occurrence of breakage and cracks caused due to bonding of optical elements is ignored even in the case where a bonded optical element is formed with the use of optical elements of which bonded faces have corners as in Patent Document 2, for example.

The present invention has been made in view of the foregoing and has its object of suppressing occurrence of breakage and cracks caused due to bonding of optical elements.

Means for Solving the Problems

A bonded optical element in accordance with the present invention includes a first optical element and a second optical element bonded to each other by forming the second optical element by heating and pressing against the first optical element a second optical element material, wherein a lens face part of a bonded face of the first optical element is concave, and a bonded face of an intermediate portion between a lens portion and an edge portion of the first optical element has a curvature.

Another bonded optical element in accordance with the present invention includes a first optical element and a second optical element bonded to each other by forming the second optical element by heating and pressing against the first optical element a second optical element material, wherein the second optical element is larger in diameter than the first optical element, and part of an outer peripheral face which is part of a bonded face of the first optical element has a curvature.

EFFECTS OF THE INVENTION

According to the present invention, occurrence of breakage and cracks caused due to bonding of the optical elements can be suppressed.

BRIEF DESCRIPTION OF THE DRAWINGS

FIG. 2 presents schematic sectional views showing a bonded optical element manufacturing method, wherein FIG. 2(a) shows a state in which formation of a second optical element is prepared and FIG. 2(b) shows a state in which formation of the second optical element is completed.

BEST MODE FOR CARRYING OUT THE INVENTION

An embodiment of the present invention will be described below with reference to the accompanying drawings.

Embodiment 1

Figure 1:
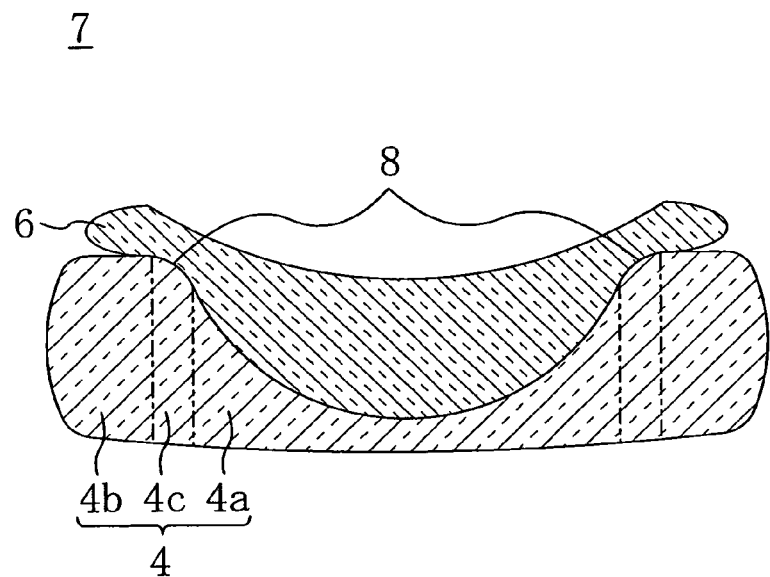
FIG. 1 is a sectional view of a bonded optical element in accordance with an embodiment of the present invention.

FIG. 1 is a sectional view of a bonded optical element 7 in accordance with the present embodiment. As shown in FIG. 1, the bonded optical element 7 includes first and second optical elements 4, 6. The first optical element 4 is a spherical concave meniscus lens having an outer diameter of 14 mm, a center thickness of 2 mm, and an edge thickness of 4 mm.

The first optical element 4 includes a lens portion 4a, an edge portion 4b surrounding the lens portion 4a, and an intermediate portion 4c arranged between the lens portion 4a and the edge portion 4b to connect them 4a, 4b. A bonded face (the upper face) of the lens portion 4a to the second optical element 6 serves as a lens face (an optically functioning face). The lens face, which includes an optically effective face, is a curved face ranging up to a bonded face (the upper face) 8 of the intermediate portion 4c to the second optical element 6. The bonded face 8 of the intermediate portion 4c has a curvature including a radius of approximately 0.5 mm. The bonded face of the lens portion 4a, the bonded face 8 of the intermediate portion 4c, and the bonded face of the edge portion 4b, which are bonded to the second optical element 6, continue smoothly. In other words, the bonded face of the first optical element 4 to the second optical element 6 continues smoothly.

The first optical element 4 is made of a material, PBK40 (a product by Sumida Optical Glass Inc.) having a refractive index rid of 1.51760, an Abbe number vd of 63.5, a glass transition temperature (transition temperature) Tg of 501° C., and a glass softening temperature (a flexure temperature) At of 549° C. The first optical element 4 is formed by polishing.

The second optical element 6 is bonded directly to the upper face of the first optical element 4 to be integrated therewith. The second optical element 6 is a spherical convex meniscus lens having an outer diameter of 12 mm, a center thickness of 4 mm, and an edge thickness of 1.5 mm. The second optical element 6 is made of a material, SF8 (a product by Sumida Optical Glass Inc.) having a refractive index nd of 1.68893, an Abbe number vd of 31.2, a glass transition temperature Tg of 430° C., and a glass softening temperature At of 459° C. Namely, the glass softening temperature At of the second optical element 6 is lower than the glass transition temperature Tg and the glass softening temperature At of the first optical element 4.

Figure 2:
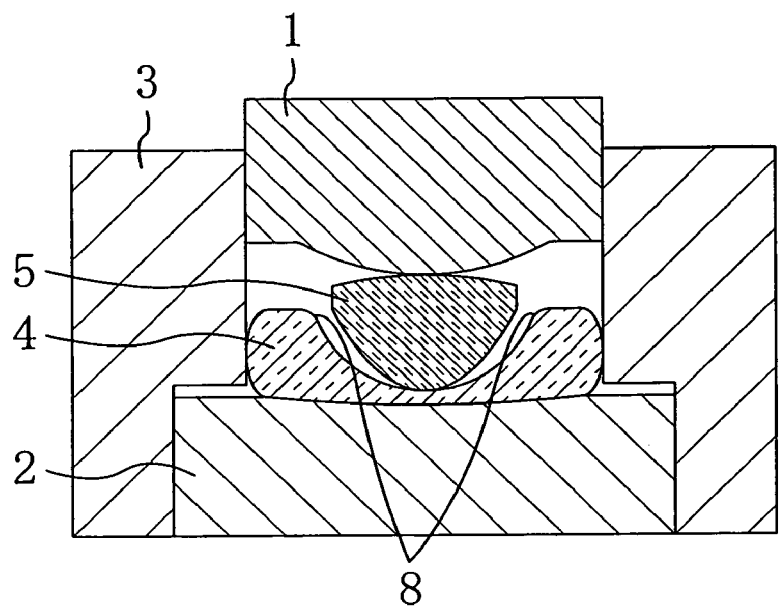
Figure 2:
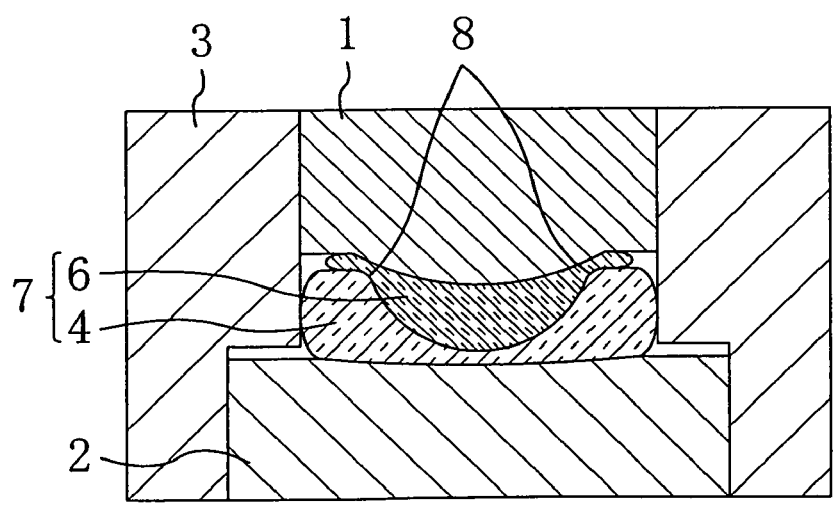

A method for manufacturing the bonded optical element 7 will be described below with reference to FIG. 2. FIG. 2 presents schematic sectional views showing the method for manufacturing the bonded optical element 7, wherein FIG. 2(a) shows a state in which formation of the second optical element is prepared and FIG. 2(b) shows a state in which formation of the second optical element is completed.

First, the first optical element 4 and a second optical element material 5 are prepared. The outer diameter of the first optical element 4 is almost the same as the inner diameter of a sleeve die 3, as shown in FIG. 2. Next, a lower die 2 is inserted into the sleeve die 3, and the first optical element 4 is put on the lower die 2. Subsequently, the second optical element material 5 is put on the first optical element 4, and then, an upper die 1 is inserted into the sleeve die 3 so as to be placed on the second optical element material 5. When the upper die 1 and the lower die 2 are inserted into the sleeve die 3, the centers of the upper die 1 and the lower die 2 are aligned with each other.

With the use of the upper die 1, the lower die 2, and the sleeve die 3, the second optical element material 5 is pressed against the first optical element 4 while being heated at a temperature incapable of deforming the first optical element 4 and capable of deforming the second optical element material 5. In the present embodiment, the heating temperature is 485° C., the applied pressure is 200 kgf/cm$^2$, and the pressing period of time is 40 seconds. Thus, the second optical element 6 is formed, as shown in FIG. 2(b).

Herein, the bonded face 8 of the intermediate portion 4c of the first optical element 4 includes a curvature to cause neither breakage nor cracks, which are liable to be caused at the portion.

Thus, the bonded optical element 7 is formed in which the second optical element 6 is bonded to and integrated with the upper face of the first optical element 4. The thus obtained bonded optical element 7 is excellent in quality with no breakage, no crack, and no opacity.

As described above, in the present invention, the bonded face of the intermediate portion 4c of the first optical element 4 has a curvature, thereby suppressing occurrence of breakage and cracks caused due to bonding of the first and second optical elements 4, 6 to each other.

Figure 3:
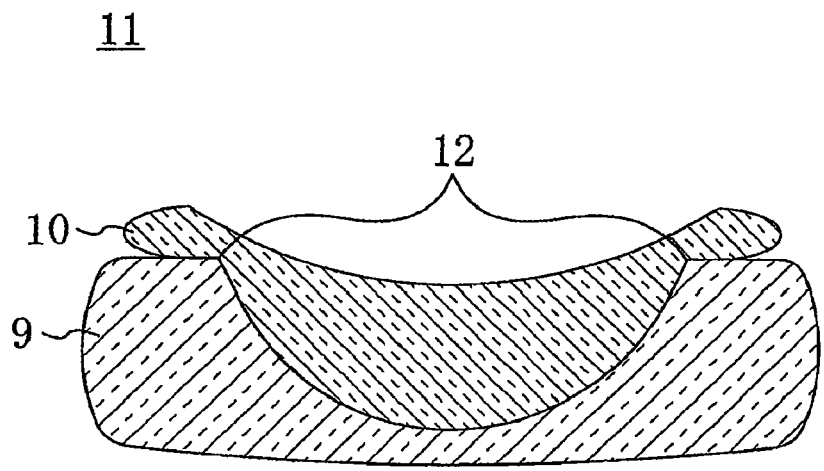
FIG. 3 is a sectional view of a bonded optical element of which first optical element has a bonded face having corners.

In contrast, a bonded optical element as above was formed with the use of a first optical element 9 of which bonded face has corners 12, as shown in FIG. 3. In this case, breakage or a crack readily occurred at the corners 12, thereby resulting in unstable supply of excellent bonded optical element 11. Accordingly, it can be said that elimination of a corner from the bonded face of the first optical element 4 leads to suppression of occurrence of breakage and cracks.

The outer diameter and the thickness of each of the first and second optical elements 4, 6 may be arbitrary values different from the values in the above embodiment. As well, the hating temperature, the applied pressure, the pressing period of time may be arbitrary values different from the values in the above embodiment.

In addition, the first optical element 4 is a spherical concave meniscus lens in the present invention but may be any lens as long as the lens face of the bonded face of the first optical element 4 is concave. For example, the first optical element 4 may be a spherical biconcave lens or a spherical planoconcave lens. Further, one or both of the faces opposite to the bonded faces of the first and second optical elements may be aspheric.

Embodiment 2

The present embodiment is different from Embodiment 1 in structures and the like of the first and second optical elements 4, 6. These differences will be described below briefly.

Figure 4:
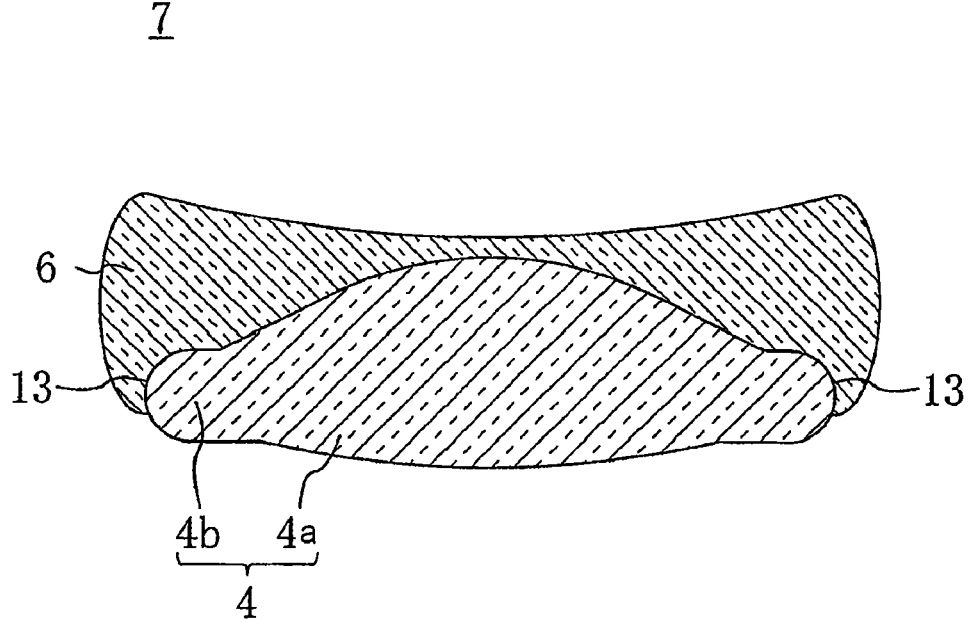
FIG. 4 is a sectional view of a bonded optical element.

As shown in FIG. 4, a first optical element 4 is a spherical biconvex lens. The first optical element 4 includes a lens portion 4a and an edge portion 4b arranged around the periphery of the lens portion 4a. Part of an outer peripheral face 13 which is part of the bonded face of the edge portion 4b to the second optical element 6 has a curvature. Namely, the face bonded to the second optical element 6 in the outer peripheral face 13 of the first optical element 4 has a curvature. The bonded face of the lens portion 4a and the bonded face of the edge portion 4b continue to each other smoothly. The second optical element 6 is a spherical biconcave lens. The outer diameter of the second optical element 6 is larger than that of the first optical element 4. The second optical element 6 is in contact with the outer peripheral face 13 of the first optical element 4.

For manufacturing the bonded optical element 7, a second optical element material 5 is pressed against the first optical element 4 with the use of a sleeve die 3 of which inner diameter is larger than the outer diameter of the first optical element 4 so that the second optical element 6 has an outer diameter larger than the first optical element 4. Herein, according to the above description, there is a space between the outer peripheral face of the first optical element 4 and the inner peripheral face of the sleeve die 3, so that the second optical element material 5 flows into the space, with a result that the second optical element 6 is in contact with the outer peripheral face of the first optical element 4.

Hence, since the part of the outer peripheral face 13 which is part of the bonded face of the first optical element 4 has a curvature, occurrence of breakage and cracks caused due to bonding of the first and second optical elements 4, 6 to each other can be suppressed. In other words, elimination of corners from the bonded face, of the first optical element 4 suppresses occurrence of breakage and cracks.

The first optical element 4 is a spherical biconvex lens in the present embodiment but may be any lens. For example, the first optical element 4 may be a spherical planoconvex lens or a spherical convex meniscus lens. Alternatively, the first optical element 4 may be a concave lens.

Other Embodiments

The first optical element 4 is formed by polishing in each of the above embodiments, but the present invention is not limited thereto and the first optical element may be formed by press forming, for example.

Figure 5:
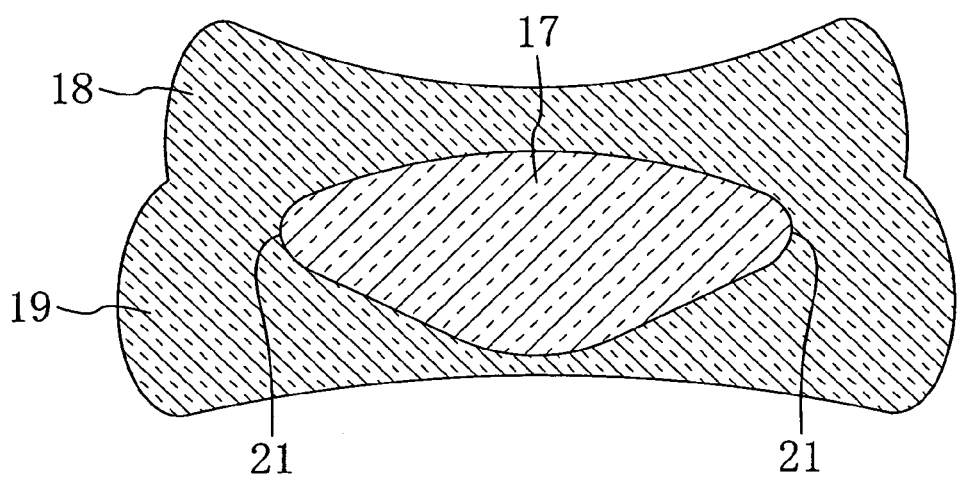
FIG. 5 is a sectional view of a bonded optical element in which a second optical element and a third optical element arc bonded to and integrated with the upper face and the lower face of a first optical element, respectively.

In each of the above embodiments, a third optical element may be further provided which is bonded to and integrated with the first or second optical element. For example, as shown in FIG. 5, a spherical biconvex lens having a curved outer peripheral face 21 protruding radially outward is prepared as a first optical element 17. The curved outer peripheral face 21 continues smoothly to the upper face and the lower face of the first optical element 17. Then, a second optical element 18 and a third optical element 19, which is made of the same material as the second optical element 18, are directly bonded to and integrated with the upper face and the lower face of the first optical element 17, respectively, by the same manner as in Embodiment 2 to enclose the first optical element 17. To do so, the second and third optical elements 18, 19 are formed simultaneously. With the curved outer peripheral face 21 of the first optical element 17, as shown in FIG. 5, occurrence of breakage and cracks caused due to bonding of the first to third optical elements 17 to 19 is suppressed. In other words, elimination of corners from the bonded face of the first optical element 17 suppresses occurrence of breakage and cracks.

The first and second optical elements 4, 6 are made of the aforementioned glass materials in each of the above embodiments, but the present invention is not limited thereto and they may be made of glass materials different from the glass materials in the above embodiments or may be made of plastic. Wherein, the first and second optical elements 4, 6 are preferably made of glass materials. The glass-made first and second optical elements 4, 6 bring the bonded optical element 7 to have a highly accurate form, high heat resistance, high mechanical durability, and high homogeneity. The same is applicable to the aforementioned bonded optical element 7 including the third optical element.

Figure 6:
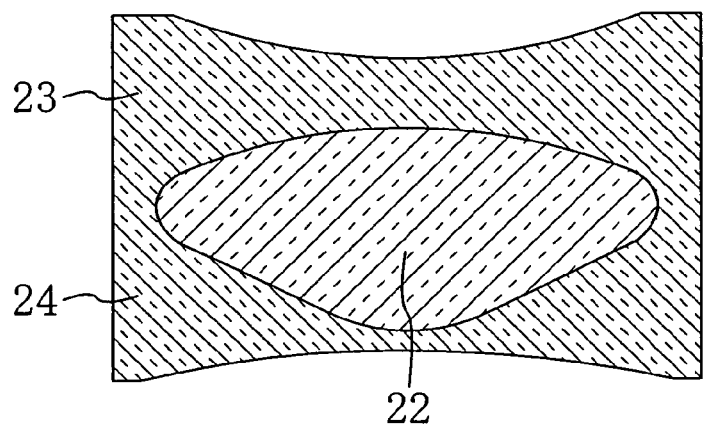
FIG. 6 is a sectional view of a bonded optical element in which only second and third optical elements are subjected to centering.

In each of the above embodiments, at least one of the optical elements may be centered after bonding and integrating the optical elements. For example, as shown in FIG. 6, after first to third optical elements 22 to 24 are bonded to and integrated with one another, only the second and third optical elements 23, 24 may be centered. Alternatively, only one of the second and third optical elements 22, 23 may be centered, or all of the first to third optical elements 22 to 24 may be centered. Centering in this way improves the eccentricity accuracy of the bonded optical element 7.

Figure 7:
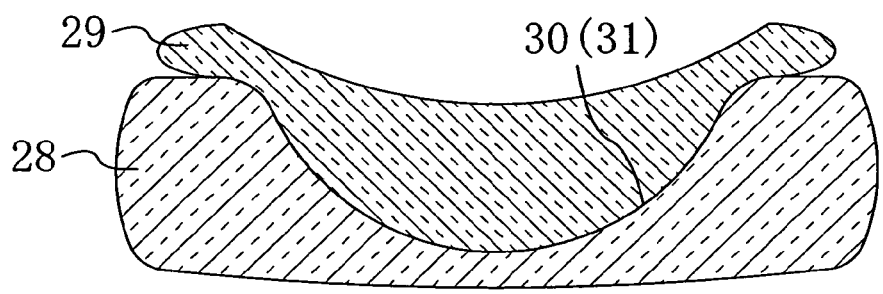
FIG. 7 is a sectional view of a bonded optical element of which lens face parts of bonded faces are aspheric.

The first optical element 4 is a spherical lens in each of the above embodiments, but a lens face part (an optically functioning face) 30 of the bonded face of a first optical element 28 to a second optical element 29 may be aspheric, as shown in FIG. 7. In this case, a lens face part 31 of the bonded face of the second optical element 29 to the first optical element 28 is aspheric also. The aspheric lens face parts 30, 31 of the bonded faces of the bonded optical element 7 lead to an improvement on the degree of freedom in designing an optical system, thereby leading to multifunction and compaction of an optical system. In the case where the first optical element 28 is formed by press forming herein, the lens face part 30 thereof can be easily formed so as to be aspheric. The same is applicable to the aforementioned bonded optical element 7 including the third optical element.

The present invention is not limited to the above embodiments and can be reduced in practice in various ways without deviating from the sprit and the main subject matter of the present invention.

As described above, the above embodiments are mere examples in every aspect and must not be construed limitedly. The scope of the present invention is indicated by the attached claims and is not limited to the specification. Further, any of variations and modifications belonging to the equivalent scope of the claims fall in the scope of the present invention.

INDUSTRIAL APPLICABILITY

As described above, the present invention is applicable for the purpose of suppressing occurrence of breakage and cracks in bonding optical elements.

What is claimed is:

1. A bonded optical element comprising a first optical element and a second optical element bonded to each other by forming the second optical element by heating and pressing against the first optical element a second optical element material, wherein
   a lens face part of a bonded face of the first optical element is concave, and
   a bonded face of an intermediate portion between a lens portion and an edge portion of the first optical element includes a curvature.

2. The bonded optical element of claim 1, further comprising:
   a third optical element bonded to the first or second optical element.

3. The bonded optical element of claim 1, wherein the optical elements are made of glass materials.

4. The bonded optical element of claim 1, wherein
   at least one of the optical elements is centered after the optical elements are bonded to each other.

5. The bonded optical element of claim 1, wherein
   the lens face parts of the bonded faces of the optical elements are aspheric.

6. The bonded optical element of claim 1, wherein
   the curvature has a radius of approximately 0.5 mm.

7. A bonded optical element comprising a first optical element and a second optical element bonded to each other by forming the second optical element by heating and pressing against the first optical element a second optical element material, wherein the second optical element is larger in diameter than the first optical element, and
   part of an outer peripheral face which is part of a bonded face of the first optical element has a curvature.

8. The bonded optical element of claim 7, further comprising:
   a third optical element bonded to the first or second optical element.

9. The bonded optical element of claim 7, wherein the optical elements are made of glass materials.

10. The bonded optical element of claim 7, wherein
    at least one of the optical elements is centered after the optical elements are bonded to each other.

11. The bonded optical element of claim 7, wherein the lens face parts of the bonded faces of the optical elements are aspheric.

12. The bonded optical element of claim 7, wherein the curvature has a radius of approximately 0.5 mm.

* * * * *